Oct. 24, 1950     H. B. YOUNG     2,527,088
GLAND PACKING
Filed Aug. 27, 1945
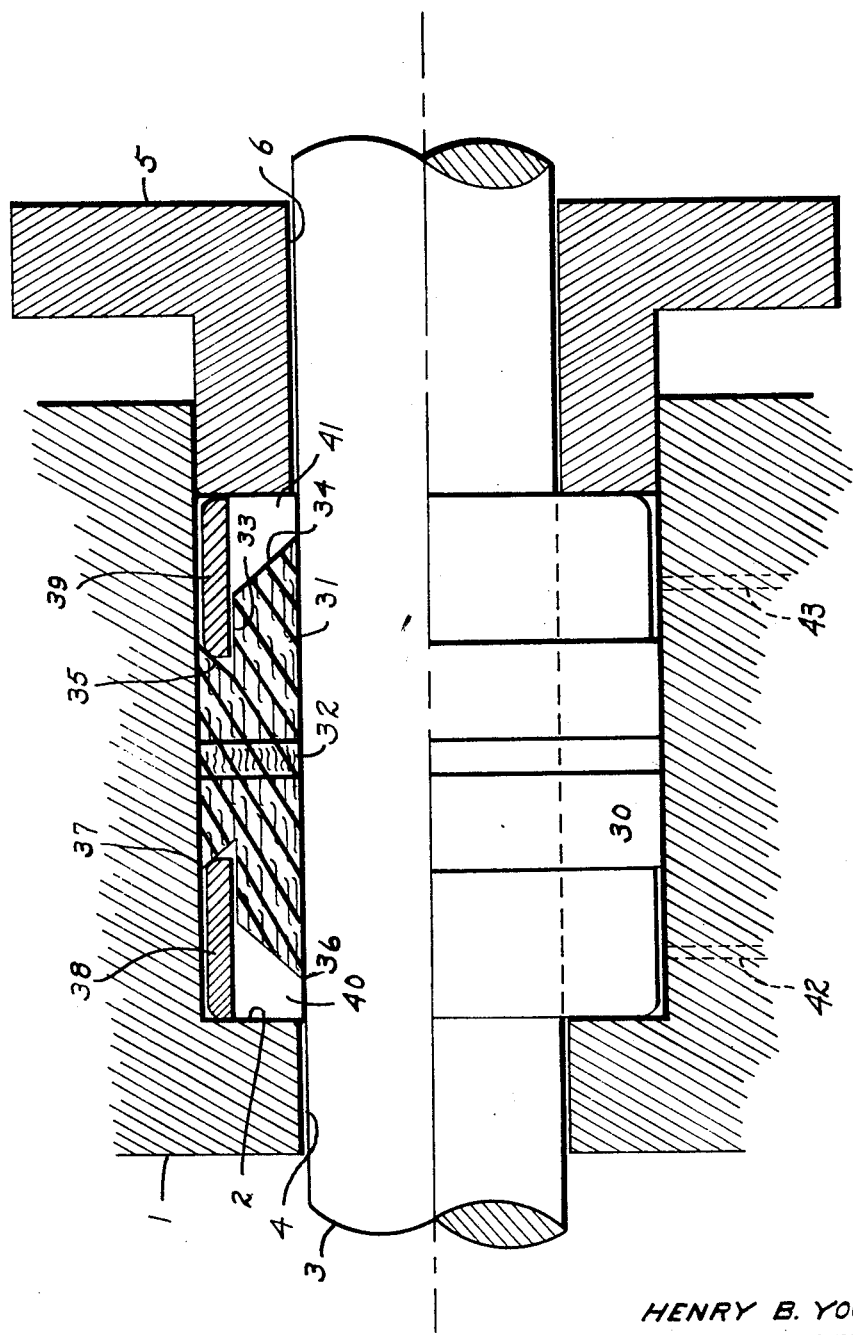
HENRY B. YOUNG
INVENTOR.
BY Lester B. Clark
    Ray L. Smith
ATTORNEYS.

Patented Oct. 24, 1950

2,527,088

UNITED STATES PATENT OFFICE 2,527,088

GLAND PACKING

Henry B. Young, Houston, Tex., assignor to Mission Manufacturing Company, Houston, Tex., a corporation of Texas Application August 27, 1945, Serial No. 612,863

4 Claims. (Cl. 286—26)

This invention relates to a stuffing box or gland and packing therefor, the component parts thereof being so constructed and arranged that they provide a seal against the passage of fluid in either direction axially of a reciprocating rod or shaft passing therethrough.

When a resilient packing is used in a stuffing box or gland, and particularly when a lipped type of packing is used, difficulty is frequently experienced from excessive tightening of the gland whereby the functioning of the packing is impaired and in some cases is rendered inoperative and eventually destroyed. Furthermore, the use of this type of packing as heretofore used is capable of sealing against pressure in one direction only along the surfaces with which a seal is effected. In many cases it is desirable to effect a seal about a shaft or rod that will resist leakage therein whether there be pressure or suction tending to produce leakage.

It is the primary object of the invention to provide a structure whereby an effective seal in both directions axially of the packed member is provided, and the difficulties from excessive tightening are avoided.

Another object is to provide a packing assembly that is simple and inexpensive to construct and to maintain.

It is also an object to provide a packing assembly including a packing having oppositely extending paired annular lips and cooperating spacing means engaging with shouldered portions of the packing to restrain the packing from movement axially of the shaft or rod about which a seal is effected.

The foregoing objects together with other objects and advantages of the invention will be more fully apparent from the following description taken in connection with the accompanying drawings, in which:

The figure is a view of a form of the invention in which a single packing member having inner and outer shoulders with outermost edges and thrust rings are provided to prevent axial movement of the packing that would result in engagement by the lips or edges with an end of the recess within which the packing is placed.

In the drawing there is shown a body 1 having a recess 2 through which passes a reciprocating or rotating rod or shaft 3, the opening 4 at one end of the recess being adapted to receive this rod or shaft. The other end of the recess is closed by a gland member 5 which is either adjustably or fixedly secured in place in a suitable manner well known in the art. This gland member has an axial opening 6 coaxial with the opening 4 in the body 1 and through which the shaft 3 passes.

It is intended that the body 1 shall be a portion of a mechanism in which pressure or suction shall be exerted in a manner that there will be a tendency of the ambient fluid to leak along the surface of the rod or shaft 3. To prevent such leakage from either pressure or suction, the invention provides a packing assembly within the recess 2, and such assembly is referred to as 30 in the drawing.

In the form of the invention shown in the drawings, the assembly 30 comprises a single packing ring such as rubber, or other suitable material, although it is to be understood that, if desired, the packing 31 may comprise separable rings. To resist undesirable deformation of the ring 31, its central portion 32 may be of a reinforced or denser material. The outer ends of this ring are reduced peripherally at 33 forming inner and outer shoulders 34 and 35 which are tapered and have outermost edges 36 and 37.

The ring 31 is positioned within the recess 2 by means of the thrust rings 38 and 39, each of which engages one of the shoulders 35 and which respectively engage the bottom of the recess 2 and the inner end of the gland 5. These rings have such peripheral dimension that they engage the shoulders 35 inwardly from the outer edges 37 and in this manner these edges are free to flex and to provide desired sealing engagement with the inner wall of the recess 2. At the same time there are thus provided chambers 40 and 41 at opposite ends of the packing and within the recess 2. In some cases a lubricant is desired within one or both of the chambers 40 and 41, and in some cases, it is desired that selected fluid, which also may act as a lubricant, shall be provided for such leakage as takes place along the rod or shaft 3. In either event, the desired fluid may be supplied to the chambers by way of the passages indicated at 42 and 43.

Broadly the invention comprehends a packing assembly in which a resilient packing is so constructed and arranged that lipped seals are provided between a rotating or reciprocating rod or shaft and a surrounding body in a manner that an effective seal is provided against either pressure or suction in either direction along the shaft.

What is claimed is:

1. A packing assembly including, a body having a recess with end openings therein, a rod or shaft axially of said recess and through said openings, packing within said recess, the outermost ends of said packing being reduced to form inner and outer annular shoulders thereon, said shoulders being inclined inwardly and outwardly respectively to form opposed inner and outer seals against leakage axially of the surface of the rod or shaft, a pair of spacer and thrust rings each engaging one end of the recess and one of said annular shoulders at points spaced from the outermost edge thereon whereby the packing is restrained from axial movement within the recess.

2. A packing assembly including, a body having a recess with end openings therein, a rod or shaft axially of said recess and through said openings, packing within said recess, the outermost ends of said packing being reduced to form inner and outer annular shoulders thereon, said shoulders being inclined inwardly and outwardly respectively to form opposed inner and outer seals against leakage axially of the surface of the rod or shaft, a pair of spacer and thrust rings each engaging one end of the recess and one of said annular shoulders at points spaced from the outermost edge thereon whereby the packing is restrained from axial movement within the recess and engagement of the edges with the ends thereof, there being a passage in said body to at least one of the chambers formed between the respective paired shoulders and an end of the recess.

3. A packing assembly including, a body having a recess with end openings therein, a rod or shaft axially of said recess and through said openings, packing within said recess, the outermost ends of said packing being reduced to form inner and outer annular shoulders thereon, said shoulders being inclined inwardly and outwardly respectively to form opposed inner and outer seals against leakage axially of the surface of the rod or shaft, a pair of spacer and thrust rings each engaging one end of the recess and one of said annular shoulders at points spaced from the outermost edge thereon whereby the packing is restrained from axial movement within the recess and engagement of the edges with the ends thereof, said packing including reinforcement intermediate the ends thereof to resist deformation of the packing under pressure exerted axially of the rod.

4. A packing assembly including, a body having a recess with end openings therein, a rod or shaft axially of said recess and through said openings, packing within said recess, the outermost ends of said packing being reduced to form inner and outer annular shoulders thereon, a pair of spacer and thrust rings each engaging one end of the recess and one of said annular shoulders at points spaced from the outermost edge thereof whereby the packing is restrained from axial movement within the recess.

HENRY B. YOUNG.

REFERENCES CITED

The following references are of record in the file of this patent:

UNITED STATES PATENTS

| Number | Name | Date |
|---|---|---|
| 1,342,734 | Barthez | June 8, 1920 |
| 2,204,915 | Sharp | June 18, 1940 |
| 2,214,261 | Roth | Sept. 10, 1940 |

FOREIGN PATENTS

| Number | Country | Date |
|---|---|---|
| 527,363 | Great Britain | of 1940 |
| 455,950 | France | of 1913 |